UNITED STATES PATENT OFFICE.

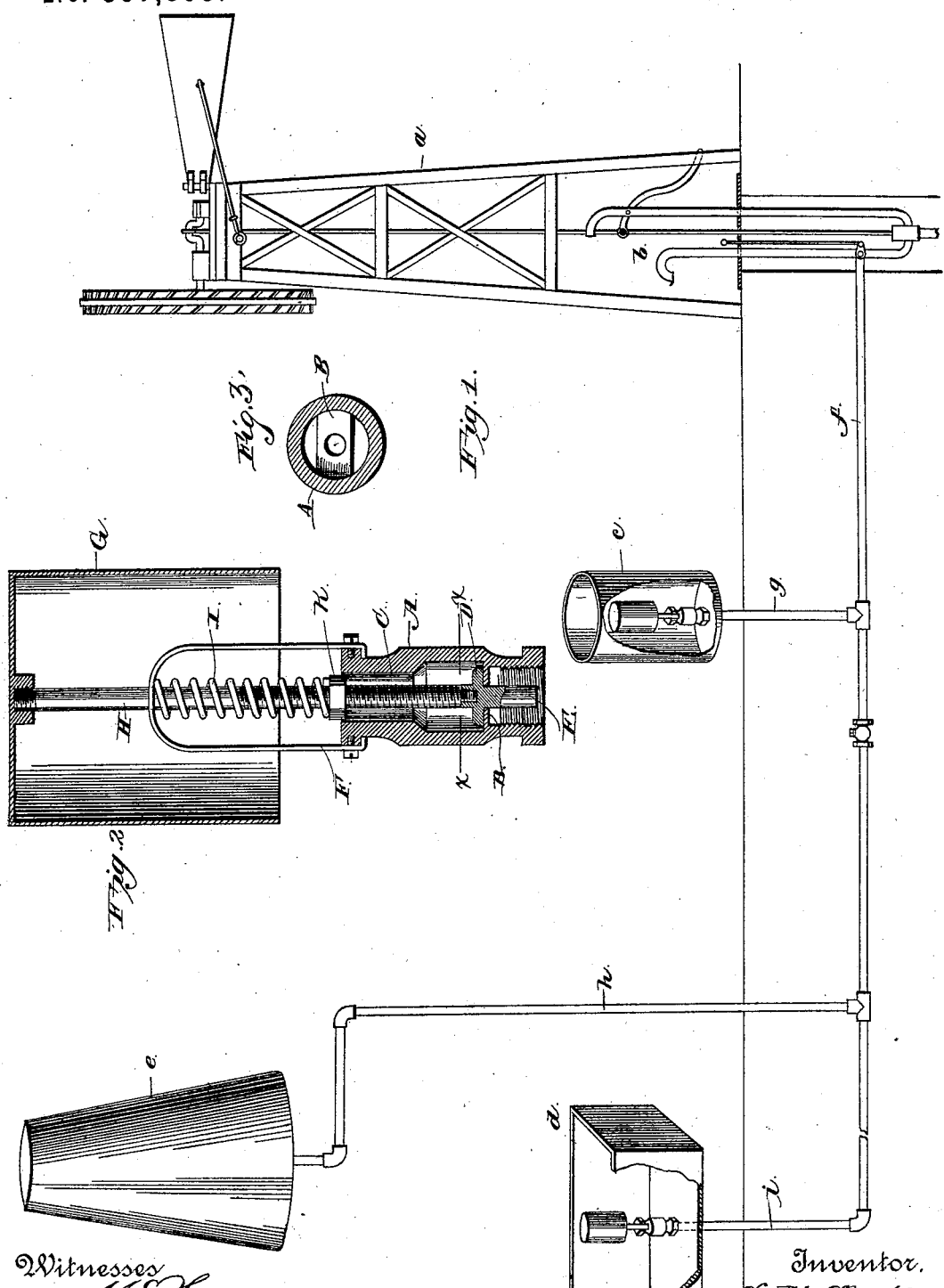

SHERWOOD M. CHASE, OF NAVARRE, OHIO.

FLOAT-VALVE FOR WATER-WORKS.

SPECIFICATION forming part of Letters Patent No. 397,895, dated February 19, 1889.

Application filed January 20, 1888. Serial No. 261,381. (No model.)

*To all whom it may concern:*

Be it known that I, SHERWOOD M. CHASE, a citizen of the United States, residing at Navarre, in the county of Stark and State of Ohio, have invented a new and useful Improvement in Float-Valves for Water-Works, of which the following is a specification.

My invention relates to an improvement in float-valves for water-works; and it consists in the peculiar construction and combination of devices that will be more fully set forth hereinafter, and particularly pointed out in the claim.

In the accompanying drawings, Figure 1 is a diagrammatic perspective view of a water-system provided with float-valves embodying my improvements. Fig. 2 is a vertical sectional view of my improved float-valve. Fig. 3 is a horizontal sectional view taken on the line $x\,x$ of Fig. 2.

$a$ represents a windmill.

$b$ represents a force-pump, which is connected to and is operated by the windmill.

$c$ represents the house supply-tank.

$d$ represents the drinking-fountain or stock-trough, and $e$ represents the reservoir or supply-tank. A pipe, $f$, leads from and communicates with the pump, and the house-tank, stock-trough, and cistern and reservoir are connected with said pipe by means of branch pipes $g$, $h$, and $i$.

The house-tank and stock-trough are each provided with one of my improved float-valves, the construction of which is as follows: A represents a vertical cylindrical valve-case, which communicates at its lower end with the supply-pipe, is provided at a suitable distance from its lower end with a bridge, B, and has at a suitable distance above the bridge a contracted neck, C, which forms the seat for a vertically-movable valve, D. The latter has a depending stud, E, which is guided in a central opening in the bridge. To the upper end of the cylindrical valve-case is secured a vertical guide-yoke, F.

G represents a cylindrical float, which has its upper end closed and its lower end open, and from the center of the top of the float depends a stem or rod, H, which is provided with screw-threads, as shown, and has its lower end reduced and threaded and adapted to connect with a threaded opening in the upper side of the valve. This stem or rod H passes through a central opening in the top of the guide-yoke. A coiled extensile spring, I, is then fitted on the stem or rod and caused to bear against the under side of the top of the guide-yoke, and a nut, K, is then screwed to the stem or rod and caused to bear against the lower end of the spring with any desired tension. The lower end of the stem or rod is then screwed to the valve, and the latter is then located in a tank or trough, as shown at Fig. 1. The tension of the spring and the gravity of the float normally lower the valve in the case from the valve-seat and thereby establish communication between the supply-pipe and the tank or trough.

The operation of my invention is as follows: When the pump is operated, water is first forced through the pipes $f$ and $g$ into the house-tank $c$ until the latter becomes filled, when the air compressed under the float of its valve raises the same and thereby closes the valve, and the water is then forced through the pipes $f$ and $i$ into the trough $d$. When the latter becomes filled, the float on the valve therein rises, so as to cut off the supply of the water to the trough, and the water is then forced through the pipes $f$ and $h$ into the reservoir $e$ and the latter is filled. When water is drawn from either the tank $c$ or the trough $d$, the float of the valve therein will be lowered with the level of the water automatically, so as to open the valve, and the water from the reservoir $e$ will be then admitted to the tank or trough to restore the water therein to its former level, and the float will be again caused to automatically close the valve. By this means the tank and the trough will be kept always supplied with water while water remains in the reservoir.

A float-valve thus constructed is extremely cheap and simple, occupies but a very small space, and is adapted to be placed in a vertical position, so as to work at all times. The float being arranged directly over the valve the same is adapted to operate with maximum efficiency.

Having thus described my invention, I claim—

The combination of the valve-case having the guide-yoke on its upper end, the float having its upper end closed and its lower end open, the rod depending from the top of said float and guided in the yoke, the vertically-movable downwardly-opening valve arranged in the valve-case and attached to the rod, the spring arranged on the latter, and bearing against the under side of the yoke, and the adjusting-nut on the said rod bearing against the lower end of the spring, substantially as described.

In testimony that I claim the foregoing as my own I have hereto affixed my signature in presence of two witnesses.

SHERWOOD M. CHASE.

Witnesses:
WILL L. BENNETT,
THOMAS PAXTON.